INVENTOR.
KURT H. HAASE

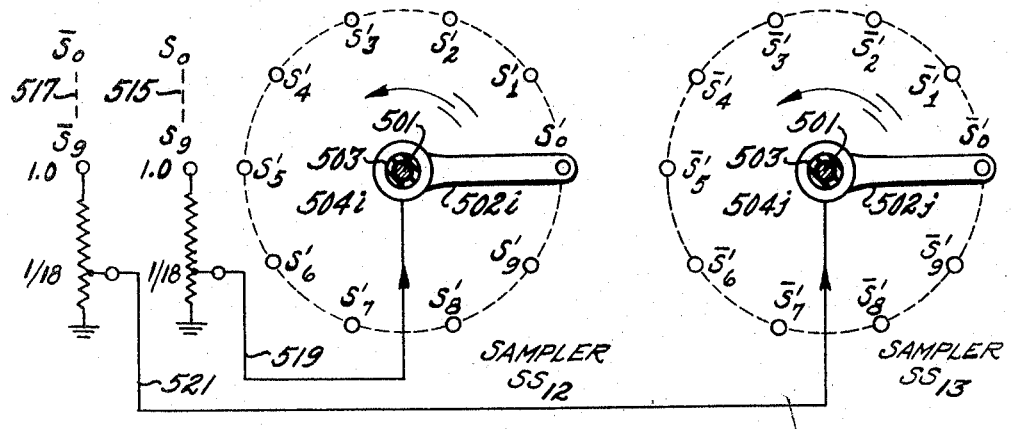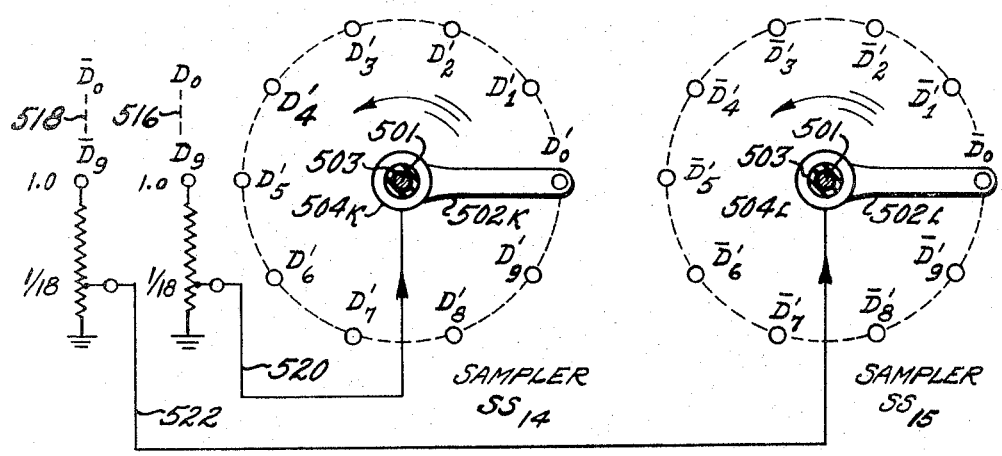
Fig. 14

Feb. 21, 1967

K. H. HAASE 3,305,675

WAVE FORM SYNTHESIZING APPARATUS

Filed June 19, 1962

INVENTOR.
KURT H. HAASE

United States Patent Office 3,305,675
Patented Feb. 21, 1967

3,305,675
WAVE FORM SYNTHESIZING APPARATUS
Kurt H. Haase, Watertown, Mass., assignor to the United States of America as represented by the Secretary of the Air Force
Filed June 19, 1962, Ser. No. 203,663
1 Claim. (Cl. 235—197)

The invention described herein may be manufactured and used by or for the United States Government for governmental purposes without payment to me of any royalty thereon.

This invention relates to synthesis of electrical signals in accordance with their harmonic content and more particularly to a novel method and apparatus for synthesizing any desired number of Fourier coefficients of the periodic functions which constitute a complex periodic wave.

The fields of engineering, applied physics and mathematics, are concerned with periodic functions in a wide range of problems, e.g. vocal and sound acoustics, space communications, study of signals based on orbit rotations, etc.

There are two parts in the study of periodic functions: (1) analysis which expresses the frequency characteristics of a periodic time function, and (2) synthesis which expresses the periodic time function of the known display of frequency characteristics.

My copending application, S.N. 840,981, entitled "Wave Form Analyzing Method and Apparatus," filed September 18, 1959, now U.S. Patent No. 3,009,106 is concerned with the first part, and the present invention is concerned with the second part.

The present invention does not have any comparison with prior art since it is based on a new principle using the "periodic spectrum" of the function.

The present invention has utility in many fields of science and engineering. For example, when the spectrum of a periodic signal radiated by a satellite under normal conditions is known, the present invention determines how the shape of the signal changes when certain ranges of its spectrum are entirely changed in amplitude or phase or both. The same is true in vocal and sound acoustics. Another important application in communications is frequency band compression. The present invention is able to immediately generate electrical analogues in which the information content is restricted to its minimum.

Accordingly, it is an object of this invention to teach a novel method of synthesizing any desired number (without limit) of Fourier coefficients as the product of a periodic coefficient and applicable real number factors.

Another object of this invention is the provision of novel automatic wave form synthesizing apparatus adapted to be utilized for the synthesization of Fourier coefficients by the novel method herein described.

Still another object of this invention is the provision of novel automatic wave form synthesizing apparatus which provides the picture of a time domain periodic function when its characteristic in the frequency domain is known.

A further object of this invention is the provision of novel automatic wave form synthesizing apparatus which provides an output in digits or analogue values representative of a periodic polygonal function.

The novel Fourier synthesizer to be described herein is based on my discovery that a continuous periodic function can always be approximated by a periodic polygonal function. A periodic polygonal trace of $2n$ straight lines equally spaced in the direction of the variable can be synthesized from $n+1$ periodic coefficients.

The present invention utilizes a predetermined number $(n)$ of periodic coefficients as input signals, the number of such inputs being dependent upon the degree of approximation of the periodic function that is desired. In accordance with a predetermined program of computation these input signals are involved in procedures of grouping and of multiplications by real numbers by the use of adding, multiplying and converting stages. This computation may be carried out by mechanical or electronic switching means, and results in $(2n)$ output signals which represent, in either digital or analogue values, the periodic function being synthesized.

The novel features which I believe to be characteristic of my invention are set forth with particularly in the appended claim. My invention itself, together with further objects and advantages thereof, can best be understood by reference to the following description taken in connection with the accompanying drawings, in which:

FIGURE 14 illustrates the $S_0 \ldots S_9$, $D_0 \ldots D_9$, and $\overline{S}_0 \ldots \overline{S}_9$, $\overline{D}_0 \ldots \overline{D}_9$, sampler;

Figure 1:
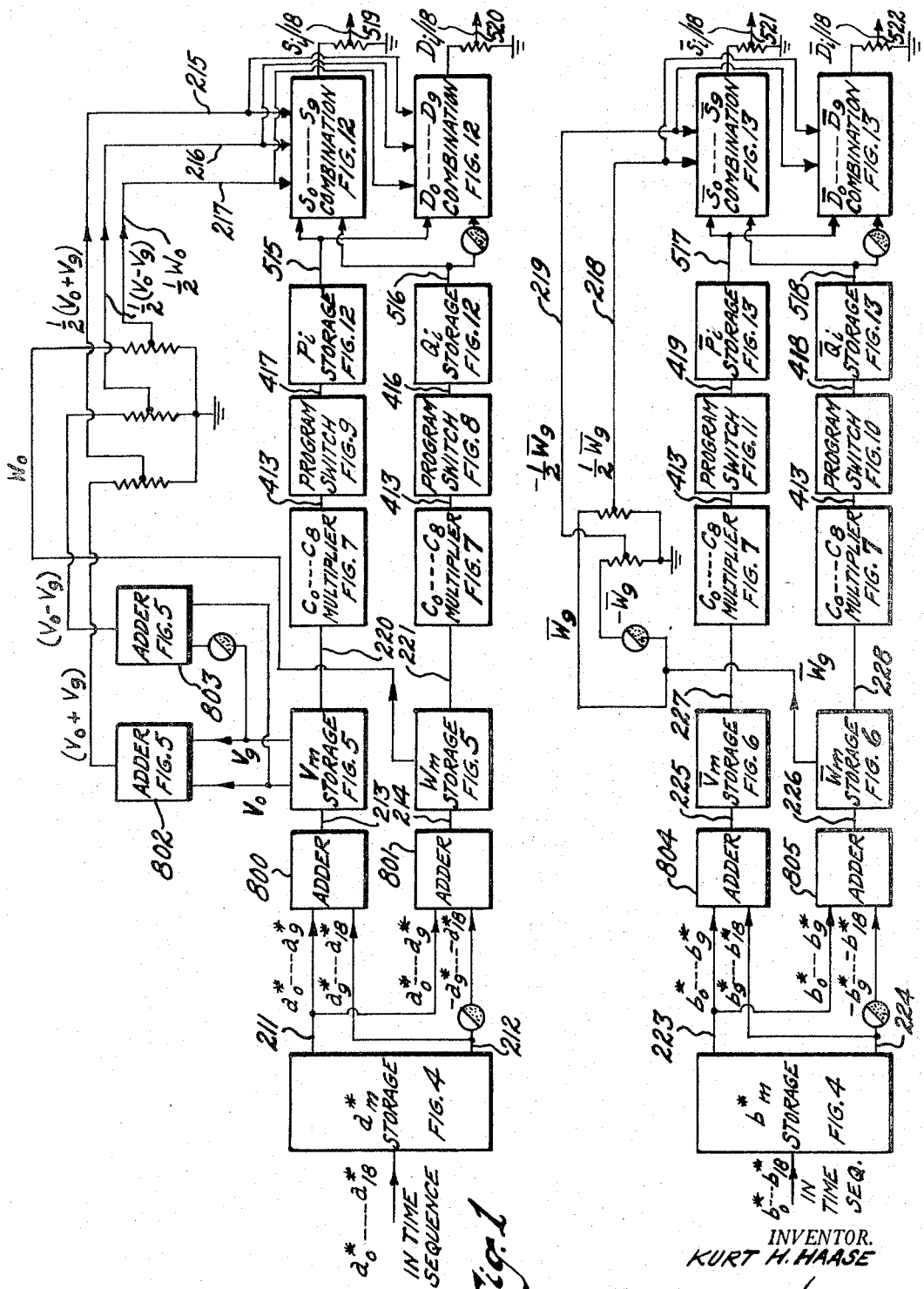
FIGURE 1 illustrates a block diagram of the component parts of the invention for the case $n=18$.

The apparatus for automatic Fourier synthesis of periodic functions is based on a theory of synthesizing periodic polygonal functions also discovered by applicant. The essential contents of this theory will be repeated in the next few paragraphs, as far as its knowledge is necessary to explain the invention. I define $f(x)$ as a periodic function with a range $0 \leq x \leq 1$ of one period. Such a function has an even $[g(x)]$ and odd $[m(x)]$ part. It is represented as $$f(x) = f(\pm k + x) = g(x) + u(x) \tag{1}$$

where K is a sequence of integers 0, 1, 2 . . . .

According to Fourier $f(x)$ can be replaced by $$f(x) = \frac{a_0}{2} \sum_{r=1}^{\infty} [a_r \cos 2\pi rx + b_r \sin 2\pi rx] \tag{2}$$

Equation 2 represents a superposition of an infinite number of cosine waves with amplitudes of $a_r$ (including a D.-C. component $a_0/2$) and an infinite number of sine waves with amplitudes $b_r$. These amplitudes are called "Fourier Coefficients." I discovered that the Fourier coefficients of $f(x)$ can be expressed by Equations 3 and 4.

$$a_r = K_n \cdot C_n(r) \cdot a_m^* \qquad (3)$$
$$b_r = K_n \cdot C_n(r) \cdot b_m^* \qquad (4)$$

If $f(x)$ is composed by a polygonal sequence of equally spaced straight lines, so that the picture of one period of $f(x)$ is a $2n$ side polygon, the $x$ directional component of each side is of the same length. Note that the periodic coefficients and the Fourier coefficients are related by Equations 3 and 4.

With
$$r = 2Kn \pm m \qquad (5)$$
$$K = 0, 1, 2, \ldots \quad 0 \leq m \leq n \qquad (6)$$
$$K_n = 1/n \qquad (7)$$
$$C_n(r) = \left[\frac{\sin 2\pi r/2n^2}{\pi r/2n}\right] = C_n(m)\left[\frac{1}{1 \pm 2kn/m}\right]^2 \qquad (8)$$
$$C_n(m) = \left[\frac{\sin m/2n}{m/2n}\right]^2 \qquad (9)$$

the selected arbitary integer $n$ has to be suitable to the approximation. The order $m$, an integer, extends to infinity. The factors $a_m^*$ and $b_m^*$ are periodic, with a period of $n$ in $m$, and are therefore called Periodic Fourier Coefficients. The infinite number of coefficients $a_m$ and $b_r$ becomes an infinite repetition of a finite number of coefficients $a_m^*$ and $b_m^*$. The factor $K_n$ is merely a scale factor in the $y$-direction. The factor $C_n(m)$ is independent of $f(x)$ and can be tabulated in parameters $n$ as a function of $m$.

Coefficients and related functions thereof are designated by the asterisk (*), said asterisk being a general symbol intended to differentiate the periodic functions comprehended by my invention from the so-called natural Fourier coefficient and related functions thereof. It is to be noted that whereas a periodic function has an infinite number of Fourier coefficients $a_r$ and $b_r$, a polygonal equally spaced periodic function has, in addition, periodic coefficients $a_0^* \ldots a_n^*$ and $b_0^* \ldots b_n^*$. This is an exact statement, true for such polygonal periodic functions. However, as far as a continuous periodic function can be approximated in a sufficient way (choosing a proper integer $n$) by such a polygonal function, then it has the same Fourier coefficient (and as its approximation) is defined in a unique manner by the periodic coefficients.

It is convenient in synthesizing computation to define the following groups of periodic coefficients:

$$V_m = a_m^* + a_{n+m}^* \qquad (10)$$
$$W_m = a_m^* - a_{n+m}^* \quad 0 \leq m \leq n/2 \text{ if } n \text{ is even} \qquad (11)$$
$$\overline{V}_m = b_m^* + b_{n+m}^* \qquad (12)$$
$$\overline{W}_m = b_m^* - b_{n+m}^* \quad 0 \leq m \leq (n-1)/2 \text{ if } n \text{ is odd} \qquad (13)$$

Note these special values:

$$a_0^* + a_n^* = a_{2n}^* + a_n^* = V_0 \qquad (10a)$$
$$a_{n/2}^* = \tfrac{1}{2} V_{n/2} \qquad (10b)$$
$$a_0^* - a_n^* = a_{2n}^* - a_n^* = W_0 \qquad (11a)$$
$$W_{n/2} = 0 \text{ by definition} \qquad (11b)$$

Since
$$b_0^* = b_n^* = b_{2n}^* = 0 \qquad (12a)$$
$$\overline{V} = 0 \qquad (12b)$$
$$\overline{V}_{n/2} = 0 \text{ by definition} \qquad (13a)$$
$$\overline{W}_0 = 0 \qquad (13b)$$
$$b_{n/2}^* = \tfrac{1}{2} \overline{W}_{n/2}$$

I have also derived the periodic coefficients indicated in Equations 3 and 4 as being:

$$a_m^* = \sum_{i=1}^{2n} y_i \cdot \cos \frac{\pi m}{n} i \qquad (14)$$

$$b_m^* = \sum_{i=1}^{2n} y_i \cdot \sin \frac{\pi m}{n} i \qquad (15)$$

Equations 14 and 15 are a system of linear equations expressing $a_m^*$ and $b_m^*$ explicitly as functions of sample values $y_i$ (identically with the polygonal corner coordinates) on the right side of the equations. The sample values $y_i$ range from $y_1$ to $y_{2n}$ and are the ordinates belonging to equally spaced parts of the period. The samples are multiplied by cosine and sine functions, respectively. The angles of these trigonometric functions are integral multiples $m \cdot i$ of the angle $\pi/n$; $m$ and $i$ are integers in the range $0 \leq m \leq n$ and $0 \leq i \leq 2n$, respectively; $n$ is called the "Subdivision Index," since in a $2n$ side periodic polygonal function the half-period is divided in $n$ equal parts. I have discovered that by substituting the Fourier coefficients expressed by Equations 3 and 4 into Equation 2, Equation 16 is obtained $$y_i = \frac{1}{2n} \sum_{m=1}^{2n} [a_m^* \cos \frac{\pi}{n} m \cdot i + b_m^* \sin \frac{\pi}{n} m \cdot i] \qquad (16)$$

with
$$0 \leq n \leq 2n \qquad (17)$$

Equation 16 expresses the samples $y_i$ explicitly as a function of periodic coefficients $a_n^*$ and $b_n^*$ and as a consequence of Equation 16

$$a_m^* = a_{2n-m}^* \qquad (18)$$
$$b_m^* = -b_{2n-m}^* \qquad (19)$$

If $n$ is an even integer $n/2$ is also an integer. By correlating $y_i$ with $y_{2n-i}$ and $y_{n+i}$ the index $i$ has to cover only the range $0 \leq i \leq n/2$ to name all $2n$ samples $y_0 \ldots y_{2n}$.

By correlating $a_m^*$ with $a_{2n-m}^*$ and $a_{n+m}^*$ and $b_m^*$ with $b_{2n-m}^*$ and $b_{n+m}^*$, then the index $m$ has to cover only $0 \leq m \leq n/2$ to name all $2n$ periodic coefficients. If $n$ is an odd integer, $n/2$ is not an integer, but $(n-1)/2$ is an integer. In this case, the index $i$ has to cover the range $0 \leq i \leq (n-1)/2$, and $m$ the range $0 \leq m \leq (n-1)/2$, to name all $2n$ samples and periodic coefficients, respectively. Since the index $i$ represents the sequence in numbering the samples, it is evident that in the defined limited ranges, all samples can be expressed by one of the groups $y_i$, $y_{2n-i}$ or $y_{n+i}$. The intercorrelation of these groups will be discussed in detail subsequently. In the process of automatic computation to synthesize the polygonal trace described by Equation 16, I have derived from Equation 16, the following formulas to yield the samples $y_i$;

$$y_{2n-i} = \frac{1}{2n} \sum_{m=1}^{2n} [a_m^* \cos \frac{\pi}{n} mi - b_m^* \sin \frac{\pi}{n} mi] \qquad (20)$$

$$y_{n-i} = \frac{1}{2n} \sum_{m=1}^{2n} [a_m^* \cos \frac{\pi}{n} mi - b_m^* \sin \frac{\pi}{n} mi] \qquad (21)$$

$$y_{n+i} = \frac{1}{2n} \sum_{m=1}^{2n} [a_m^* \cos \frac{\pi}{n} mi + b_m^* \sin \frac{\pi}{n} mi] \qquad (22)$$

By defining sample groups, substituting these groups into Equations 16, 20, 21 and 22, and by conditions 18 and 19, I derive the following expressions for sums and differences of sample groups:

$$y_i = \frac{1}{n}(S_i + \overline{S}_i) \qquad (23)$$

$$y_{2n-i} = \frac{1}{n}(S_i - \overline{S}_i) \qquad (24)$$

$$y_{n-i} = \frac{1}{n}(D_i - \overline{D}_i) \qquad (25)$$

$$y_{n+i} = \frac{1}{n}(D_i + \overline{D}_i) \qquad (26)$$

In the process of synthesis computation, it is convenient to discriminate even from odd indices, $m$ and $i$.

If $i$ is even, let $i=2\nu$. If $m$ is even, let $m=2\mu$.
If $i$ is odd, let $i=2\nu$. If $m$ is odd, let $m=2\mu-1$.

Since the subdivision index $n$ may be an even or odd integer, it belongs to any of the following classes of integers:

Class I $n$ even and $n/2$ even
Class II $n$ even and $n/2$ odd
Class III $n$ odd and $(n-1)/2$ even
Class IV $n$ odd and $(n-1)/2$ odd Naturally as soon as the subdivision index $n$ is decided, the formulas pertaining to only that class are of interest in the synthesis computation. It is to be noted there is really no essential difference between the formulas for any of the four classes against the other classes. Therefore, it is quite sufficient to describe an embodiment of my novel automatic computer device by taking any subdivision index $n$ as an example.

Figure 2:
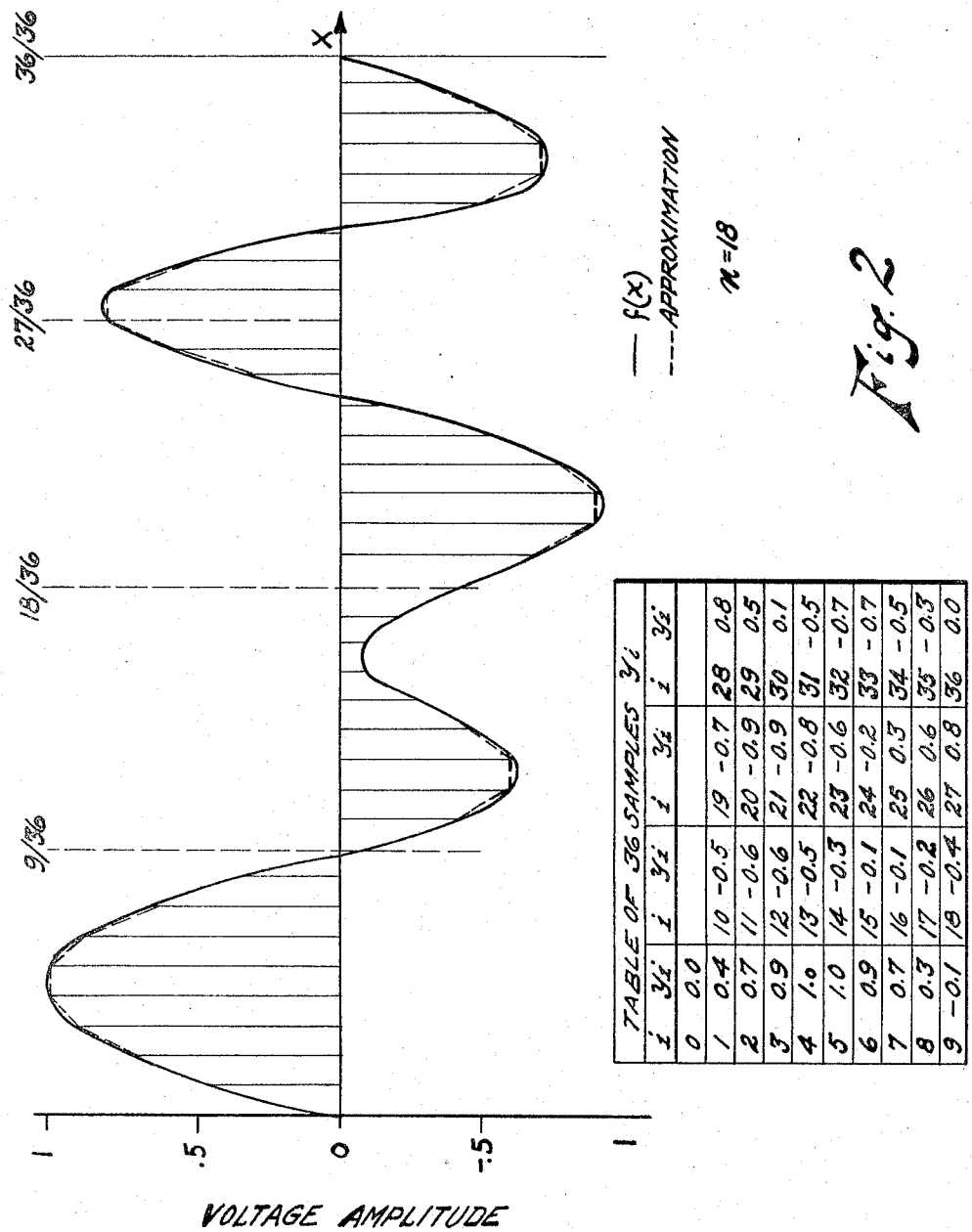
FIGURE 2 illustrates a typical straight line approximation of a periodic function where the half period is subdivided into $n=18$ equal parts.

Referring now to FIGURE 2, one period is shown of a continuous periodic function (solid curve) that is approximated by a periodic polygonal function (dotted straight lines). The range of the period is sub-divided into 36 equal parts so that $n=18$. This shape is a fairly good approximation. Deviations are noticeable only at the sharp curvatures. The sharpest curvature always determines the magnitude of $n$. As previously mentioned, I have derived additional formulas which are specialized according to the class of $n$. For the particular embodiment under consideration, namely, to synthesize a 36-side periodic polygonal trace, that is equally spaced in the $x$-direction, when the periodic coefficients are known, I use the following formulas:

$$S_{2\nu}=\tfrac{1}{2}[V_0-(-1)^\nu V_{n/2}]+P_{2\nu}+Q_{2\nu} \quad (27)$$

$$S_{2\nu+1}=\tfrac{1}{2}W_0+P_{2\nu+1}+Q_{2\nu+1} \quad (28)$$

$$D_{2\nu}=\tfrac{1}{2}[V_0-(-1)^\nu V_{n/2}]+P_{2\nu}-Q_{2\nu} \quad (29)$$

$$D_{2\nu+1}=\tfrac{1}{2}W_0+P_{2\nu+1}-Q_{2\nu+1} \quad (30)$$

with $$0\leq 2\nu\leq 8 \quad 1\leq 2\nu+1\leq 9 \quad (31)$$

To evaluate Equations 27 ... 30 in this specific embodiment, I compute the groups and sum products as follows:

$$V_{2\mu}=a_{2\mu}{}^*+a_{18+2\mu}{}^*=a_{2\mu}{}^*+a_{18-2\mu}{}^* \quad (32)$$

$$V_{2\mu-1}=a_{2\mu-1}{}^*+a_{18+(2\mu-1)}{}^*=a_{2\mu-1}{}^*+a_{18-(2\mu-1)}{}^* \quad (33)$$

$$W_{2\mu}=a_{2\mu}{}^*-a_{18+2\mu}{}^*=a_{2\mu}{}^*-a_{18-2\mu}{}^* \quad (34)$$

$$W_{2\mu-1}=a_{2\mu-1}{}^*-a_{18+(2\mu-1)}{}^*=a_{2\mu-1}{}^*-a_{18-(2\mu-1)}{}^* \quad (35)$$

$$P_{2\mu}=\sum_{\mu=1}^{4}V_{2\mu}\cos 10°\,(2\mu)2\nu \quad (36)$$

$$Q_{2\mu}=\sum_{\mu=1}^{4}V_{2\mu-1}\cos 10°(2\mu-1).2\nu \quad (37)$$

$$P_{2\mu-1}=\sum_{\mu=1}^{4}W_{2\mu}\cos 10°\,(2\mu)(2\nu+1) \quad (38)$$

$$Q_{2\mu-1}=\sum_{\mu=1}^{4}W_{2\mu-1}\cos 10°(2\mu-1)(2\nu+1) \quad (39)$$

By Equation 32 $V_0=a_0{}^*+a_{18}{}^*$, by Equation 34

$$W_0=a_0{}^*-a_{18}{}^*$$

and by Equation 33 $V_9=2.a_9{}^*$.

Regarding the ranges given in 31 the computation will result in $V_0, V_2, \ldots V_8\ W_0, W_2 \ldots W_8\ P_0, P_2, \ldots P_8\ Q_0, Q_2, \ldots Q_8\ V_1, V_3, \ldots V_9\ W_1, W_3 \ldots W_9\ P_1, P_3, \ldots P_9\ Q_1, Q_3, \ldots Q_9$ Consequently, by Equations 27 ... 30, I obtain $S_0, S_2, S_4, \ldots S_8\ D_0, D_2, D_4, \ldots D_8$
$S_1, S_3, \ldots S_9\ D_1, D_3, \ldots D_9$ Also, for this specific embodiment, I use the formulas:

$$\bar{S}_{2\nu}=\bar{P}_{2\nu}+\bar{Q}_{2\nu} \quad (40)$$

$$\bar{S}_{2\nu+1}=\tfrac{1}{2}(-1)^\nu \bar{W}_{n/2}+\bar{P}_{2\nu+1}+\bar{Q}_{2\nu+1} \quad (41)$$

$$\bar{D}_{2\nu}=\bar{P}_{2\nu}-\bar{Q}_{2\nu} \quad (42)$$

$$\bar{D}_{2\nu+1}=-\tfrac{1}{2}(-1)^\nu \bar{W}_{n/2}+\bar{P}_{2\nu+1}-\bar{Q}_{2\nu+1} \quad (43)$$

with $$0\leq 2\leq 8 \quad 1\leq 2+1\leq 9 \quad (44)$$

To evaluate Equations 40 ... 43, I compute these groups and products:

$$V_{2\mu}=b_{2\mu}{}^*+b_{n+2\mu}{}^*=b_{2\mu}{}^*-b_{n-2\mu}{}^* \quad (45)$$

$$V_{2\mu-1}=b_{2\mu-1}{}^*+b_{n+(2\mu-1)}{}^*=b_{2\mu-1}{}^*-b_{n-(2\mu-1)}{}^* \quad (46)$$

$$W_{2\mu}=b_{2\mu}{}^*-b_{n+2\mu}{}^*=b_{2\mu}{}^*+b_{n-2\mu}{}^* \quad (47)$$

$$W_{2\mu-1}=b_{2\mu-1}{}^*-b_{n+(2\mu-1)}{}^*=b_{2\mu-1}{}^*+b_{n-(2\mu-1)}{}^* \quad (48)$$

$$\bar{P}_{2\mu}=\sum_{\mu=1}^{4}\bar{V}_{2\mu}\sin 10°\,2\mu.2\nu \quad (49)$$

$$\bar{Q}_{2\mu}=\sum_{\mu=1}^{4}\bar{V}_{2\mu-1}\sin 10°\,(2\mu-1)2\nu \quad (50)$$

$$\bar{P}_{2\mu-1}=\sum_{\mu=1}^{4}\bar{W}_{2\mu}\sin 10°\,.2\mu.(2\nu+1) \quad (51)$$

$$\bar{Q}_{2\mu-1}=\sum_{\mu=1}^{4}\bar{W}_{2\mu-1}\sin 10°\,(2\mu-1)(2\nu+1) \quad (52)$$

Regarding the ranges given in Equation 44, the computation results in:

$\bar{V}_2, \bar{V}_4, \ldots \bar{V}_8\ \bar{W}_2, \bar{W}_4, \ldots \bar{W}_8\ \bar{P}_2, \bar{P}_4, \ldots \bar{P}_8\ \bar{Q}_2, \bar{Q}_4, \ldots \bar{Q}_8\ \bar{V}_1, \bar{V}_3, \ldots \bar{V}_9\ \bar{W}_1, \bar{W}_3, \ldots \bar{W}_9\ \bar{P}_1, \bar{P}_3, \ldots \bar{P}_9\ \bar{Q}_1, \bar{Q}_3, \ldots \bar{Q}_9$ Consequently, by Equations 40 ... 43, I obtain:

$\bar{S}_2, \bar{S}_4 \ldots \bar{S}_8\ \bar{D}_2, \bar{D}_4 \ldots \bar{D}_8$

Note that:

$\bar{S}_1, \bar{S}_3 \ldots \bar{S}_9\ \bar{D}_1, \bar{D}_3 \ldots \bar{D}_9\ \bar{P}_0=\bar{Q}_0=\bar{S}_0=\bar{D}_0=\bar{0}$ Finally, Equations 23 ... 26 yield the desired sample values:

$$y_0\ldots y_8=\tfrac{1}{18}(S_0+\bar{S}_0)\ldots\tfrac{1}{18}(S_8+\bar{S}_8)$$

$$y_{10}\ldots y_{18}=\tfrac{1}{18}(D_8-\bar{D}_8)\ldots\tfrac{1}{18}(D_0-\bar{D}_0)$$

$$y_{18}\ldots y_{26}=\tfrac{1}{18}(D_0+\bar{D}_0)\ldots\tfrac{1}{18}(D_8+\bar{D}_8)$$

$$y_{28}\ldots y_{36}=\tfrac{1}{18}(S_8-\bar{S}_8)\ldots\tfrac{1}{18}(S_0-\bar{S}_0)$$

$$y_1\ldots y_9=\tfrac{1}{18}(S_1+\bar{S}_1)\ldots\tfrac{1}{18}(S_9+\bar{S}_9)$$

$$y_9\ldots y_{17}=\tfrac{1}{18}(D_9-\bar{D}_9)\ldots\tfrac{1}{18}(D_1+\bar{D}_1)$$

$$y_{19}\ldots y_{27}=\tfrac{1}{18}(D_1+\bar{D}_1)\ldots\tfrac{1}{18}(D_9+\bar{D}_9)$$

$$y_{27}\ldots y_{35}=\tfrac{1}{18}(S_9-\bar{S}_9)\ldots\tfrac{1}{18}(S_1-\bar{S}_1)$$

To get the sum products according to Equations 36 ... 39 and 49 ... 52, I use the cosine and sine functions of multiples of $10°$. These are enumerated in the following table:

$c_1=\cos 10°=\sin 80°=0.984\ 808$
$c_2=\cos 20°=\sin 70°=0.939\ 693$
$c_3=\cos 30°=\sin 60°=0.866\ 025$
$c_4=\cos 40°=\sin 50°=0.766\ 044$
$c_5=\cos 50°=\sin 40°=0.642\ 788$
$c_6=\cos 60°=\sin 30°=0.5$
$c_7=\cos 70°=\sin 20°=0.342\ 202$
$c_8=\cos 80°=\sin 10°=0.173\ 648$ Referring now to FIGURES 1 and 16, a specific embodiment of the synthesizer will be described for the subdivision index $n=18$. The synthesis computer is fed by the periodic coefficients, leads 99 and 100, and yields the samples $y_i$, lead 614. The synthesis computer contains the following operational elements:

(1) Polarity inverting operators to convert a plus value into a negative value.

(2) Grouping operators, for example, to build the group $V_m$ and parameters $m$.

(3) Operational multipliers where, for example, group values $V_m$ are multiplied by real numbers smaller or equal to one performed by a resistor potentiometer.

Figure 3:
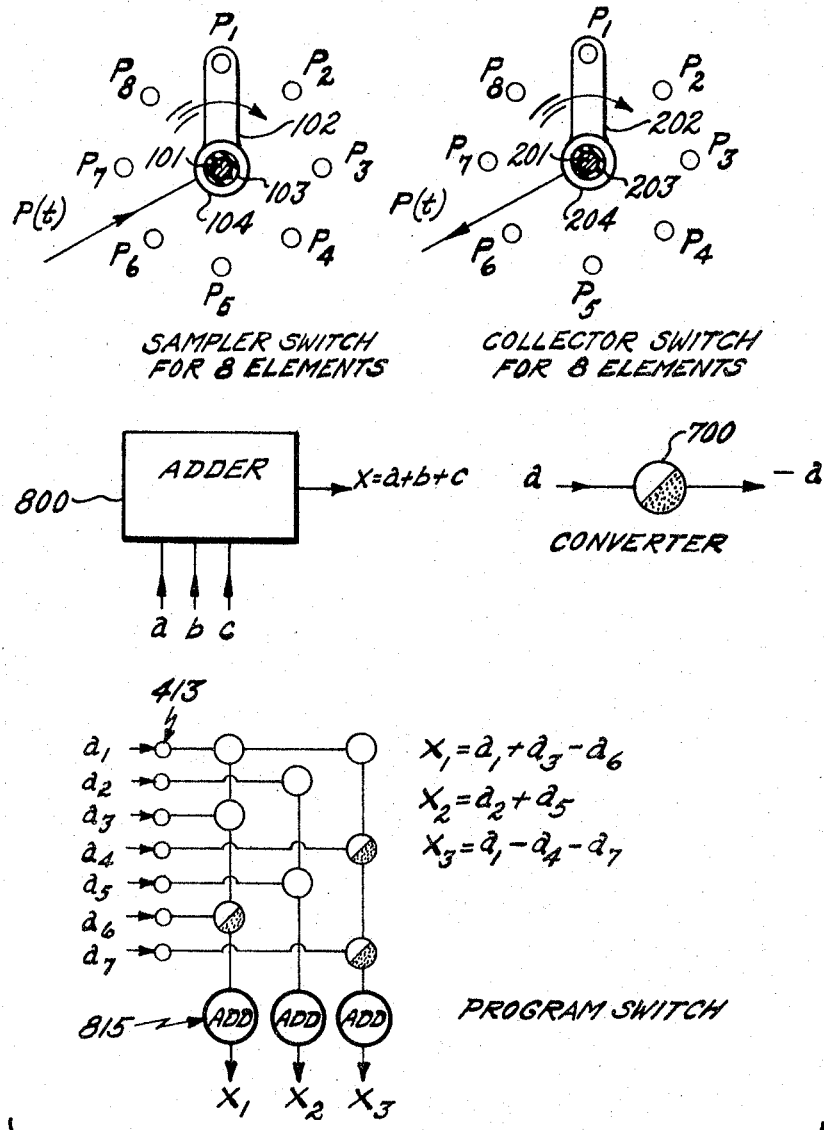
FIGURE 3 illustrates the operational elements used in the invention.
Figure 4:
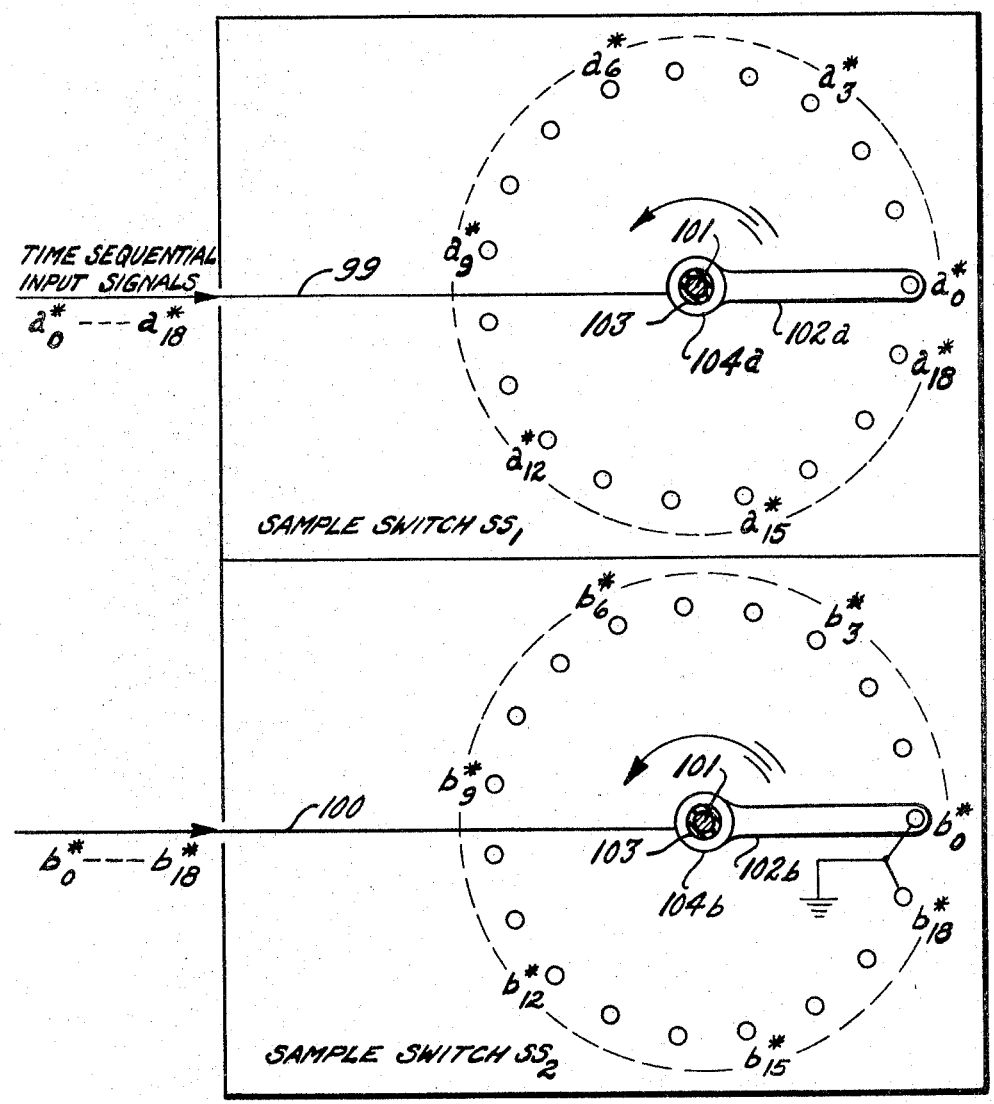
FIGURE 4 illustrates the sampler switches storing the input signals $a_m{}^*$ and $b_m{}^*$.

(4) Grouping operators to group the products received in 3, and (5) Grouping operators to yield the samples. The result may be numerical values $y_i$, or the picture of the polygonal trace, or an electric analogue of the polygonal function determined by the corner values $y_0, y_1 \ldots y_{2n}$ with $y_{2n}=y_0$. Essentially for other subdivision indices only minor changes in the apparatus are necessary. FIGURE 1 goes together with and shows the interconnection of FIGURES 3 through 14, as does FIGURE 16. The operational elements of the computer are shown in FIGURE 3. They are:

(1) Sample switches.

(2) Collector switches.

The sample switch differs from the collector switch only by the direction of the energy flux. Both switches are designed to be mechanical rotary switches with an arm rotating over concentrically arranged contacts.

As can be seen from FIGURE 3, the switches are mounted on a shaft, e.g. 101, with the collector ring, 104, insulated from the shaft by insulating sleeve, 103. The nut on arm 102 is in electrical association with collector ring 104. The collector ring controls a suitable connecting circuit.

(3) Adders, 800, to add the input values.

(4) Converters, 700, to transform a signal to its opposite polarity.

(5) Program switches to make additive combinations of input signals as illustrated in FIGURE 3.

It is to be noted that in all cases analogue signals can be replaced by digits and time sequential operations can be replaced by simultaneous operations.

Figure 16:
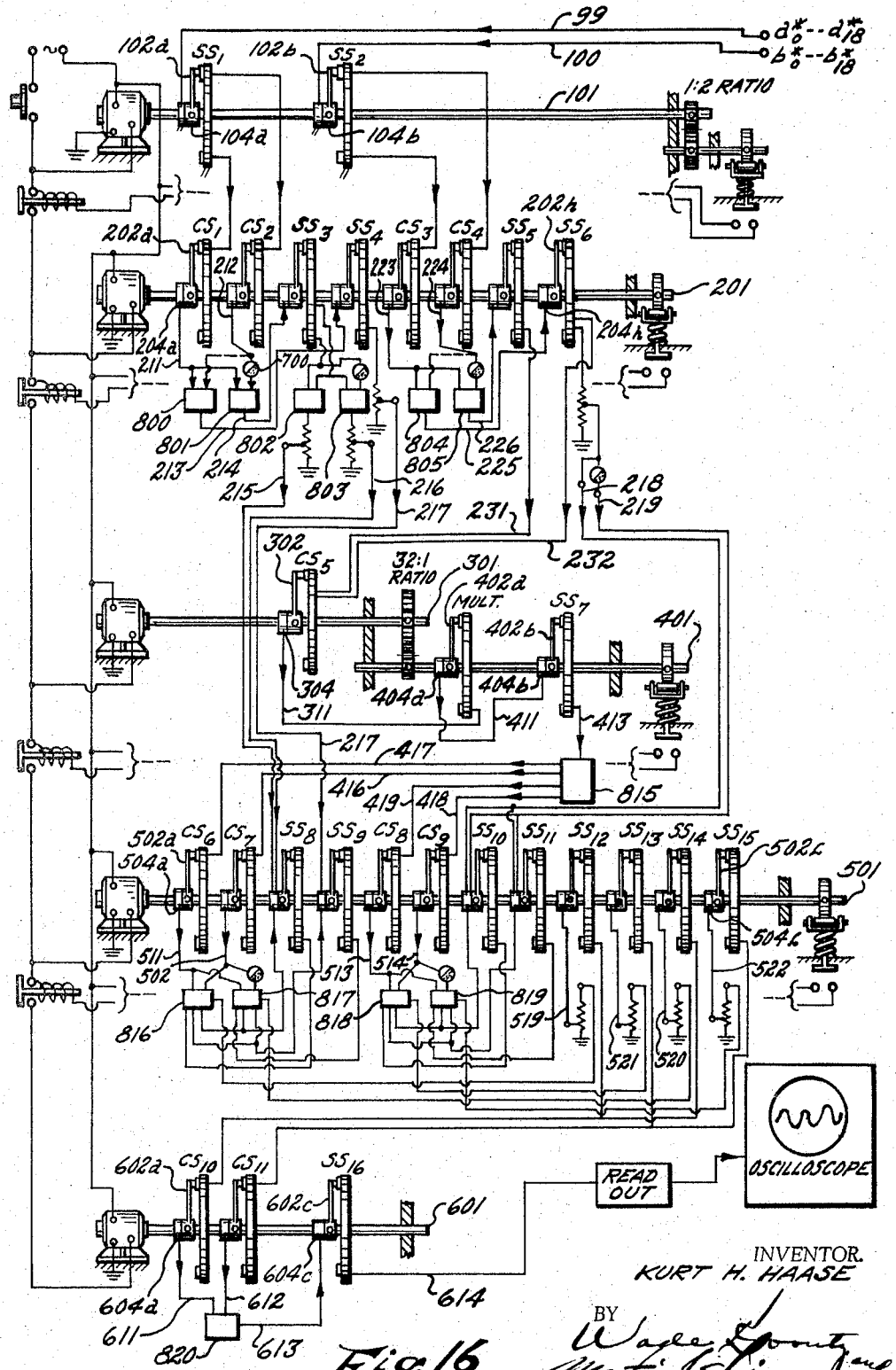
FIGURE 16 is a combination block and schematic diagram of the preferred embodiment.

Referring now to FIGURE 16, the apparatus has as its inputs in time sequence harmonic amplitude values $a_0^* \ldots a_{18}^*$, 99, and $b_0^* \ldots b_{18}^*$, 100. When these values are distributed on the contacts of $SS_1$ and $SS_2$ which are on common shaft 101, the computer can start to work.

Shaft 101 makes one revolution and stops; thus, the input values are now distributed on the circumference contacts of $CS_1$, $CS_2$, $CS_3$ and $CS_4$, all of which are on common shaft 201, because each collector switch has contacts connected with the corresponding contacts on $SS_1$ and $SS_2$.

Figure 5:
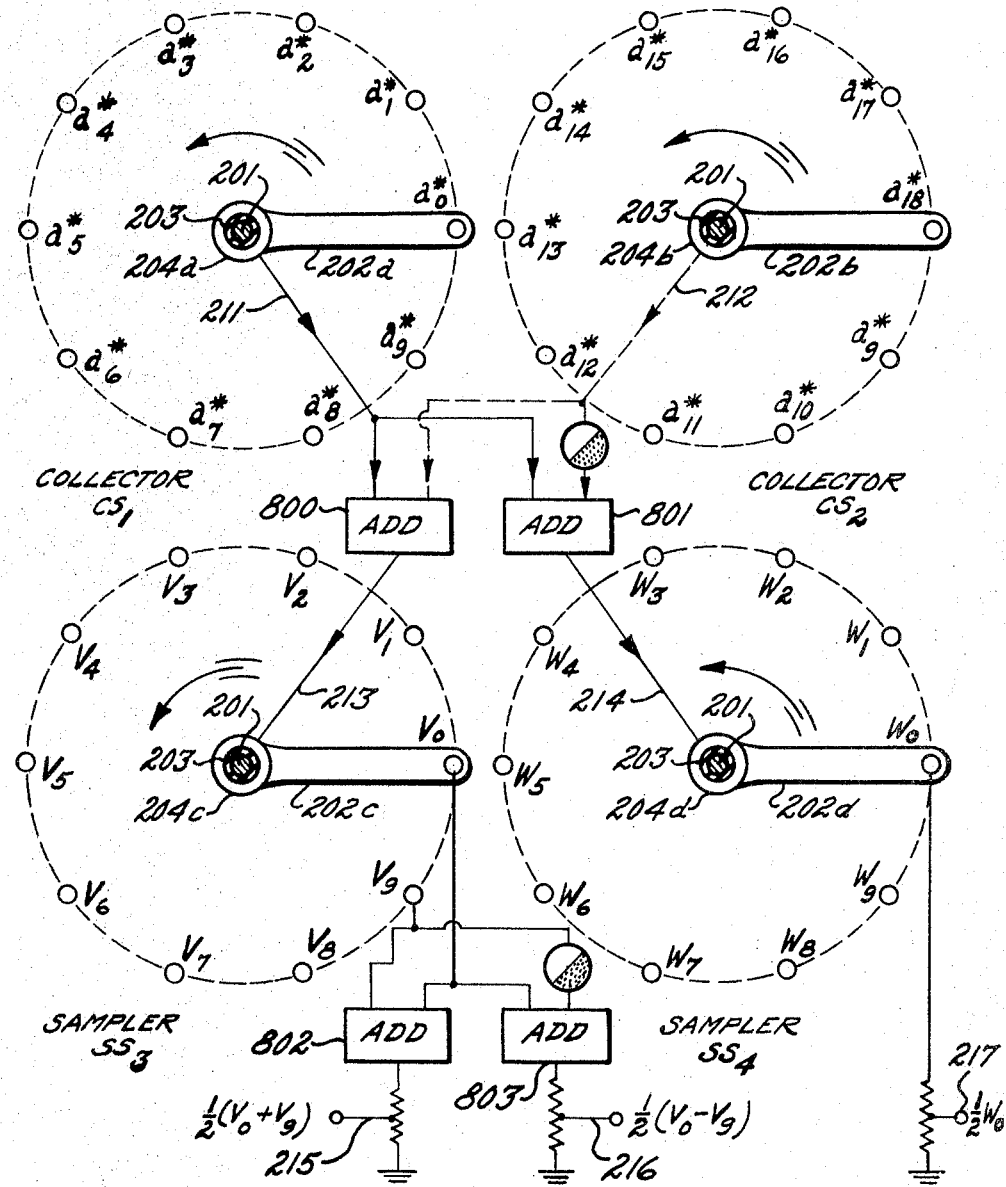
FIGURE 5 illustrates the stage to compute and to store the groups $V_m$ and $W_m$.
Figure 6:
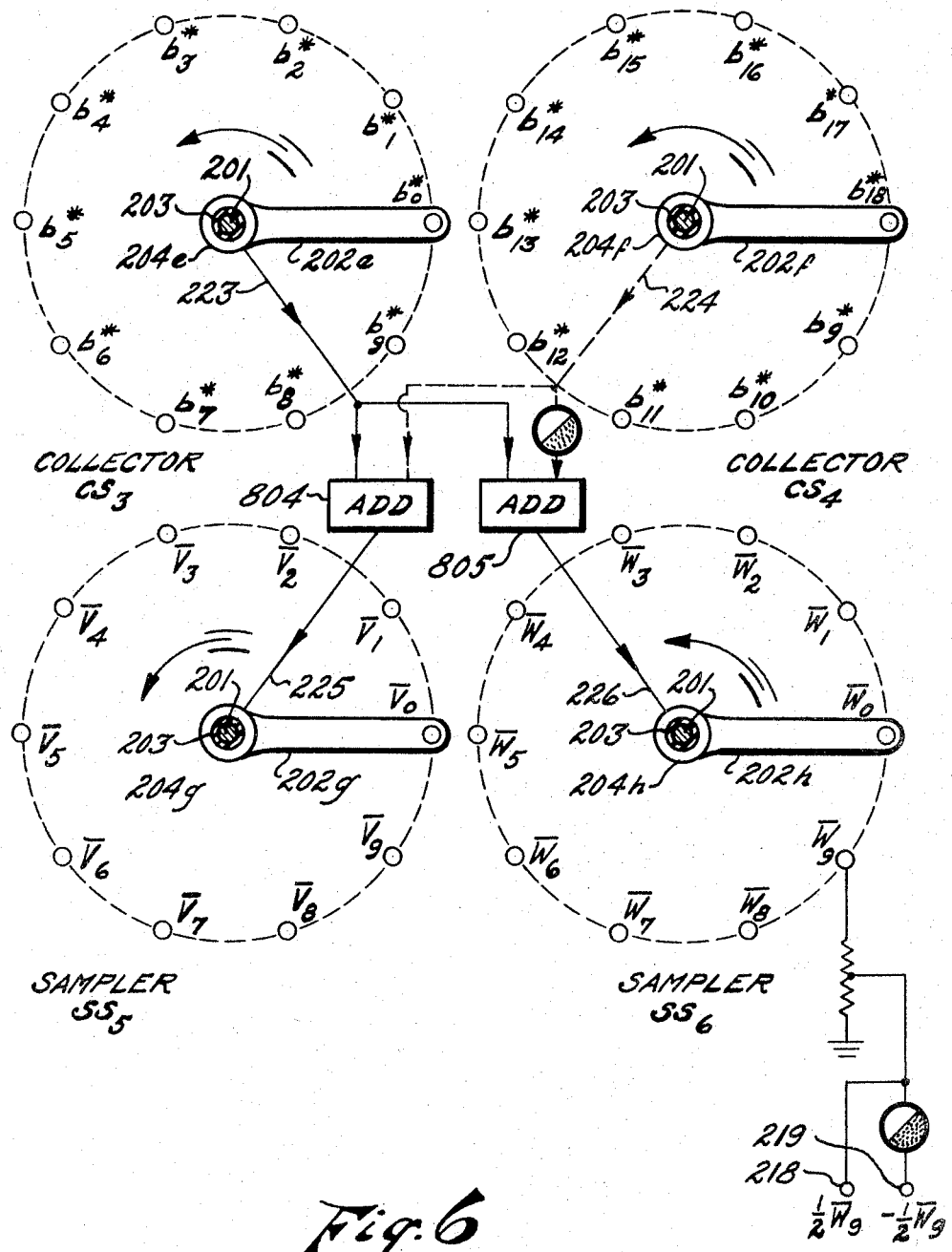
FIGURE 6 illustrates the stage to compute and to store the groups $\overline{V}_m$ and $\overline{W}_m$.

To construct the sums $V_m$ and the differences $W_m$ the collector switches $CS_1$ and $CS_2$ are used as illustrated in FIGURE 5. $CS_1$ is used for the $m$ index coefficients and $CS_2$ for the $18-m$ index coefficients where $0 \geq m \geq 9$. It can be seen that $SS_3$ and $SS_4$, $SS_5$ and $SS_6$ are also on common shaft 201. Each collector switch makes one rotation and in synchronization with these sampler switchers. These samplers store the results, for example, $V_0 \ldots V_9$ and $W_0 \ldots W_9$ obtained by the use of two adders, 800 and 801, and a converter as shown on FIGURES 5 and 16. It is to be noted that the values $\frac{1}{2}(V_0+V_9)$, $\frac{1}{2}(V_0-V_9)$ and $(\frac{1}{2}) W_0$ obtained through use of a resistor potentiometer are used in a later combination stage, FIGURE 12, leads 215, 216 and 217, respectively. In a similar manner, the sums $\overline{V}_m$ and $\overline{W}_m$ are obtained through the use of two collector switches $CS_3$ and $CS_4$, and stored on $SS_5$ and $SS_6$ as shown in FIGURE 6. The values $(\frac{1}{2}) \overline{W}_9$ and $(-\frac{1}{2}) \overline{W}_9$ are used in a later stage, leads 218 and 219. See FIGURE 13.

Figure 7:
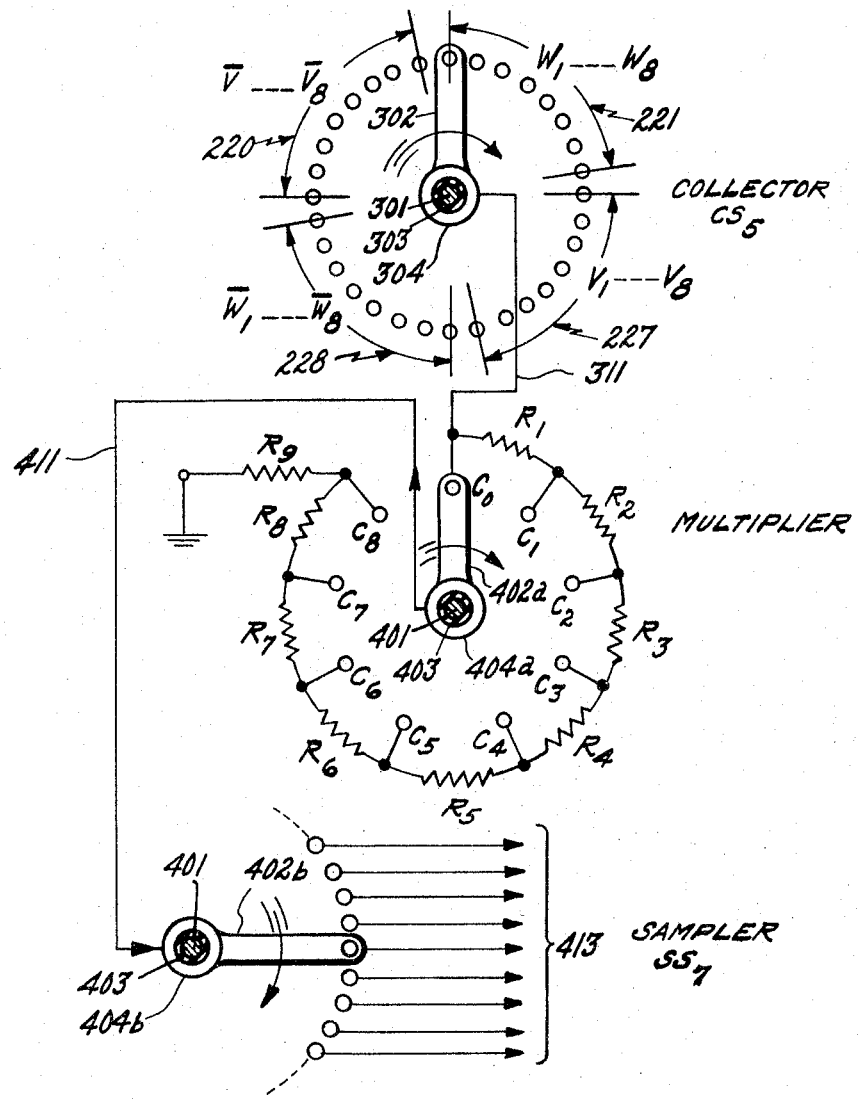
FIGURE 7 illustrates the multiplier stage.
Figure 8:
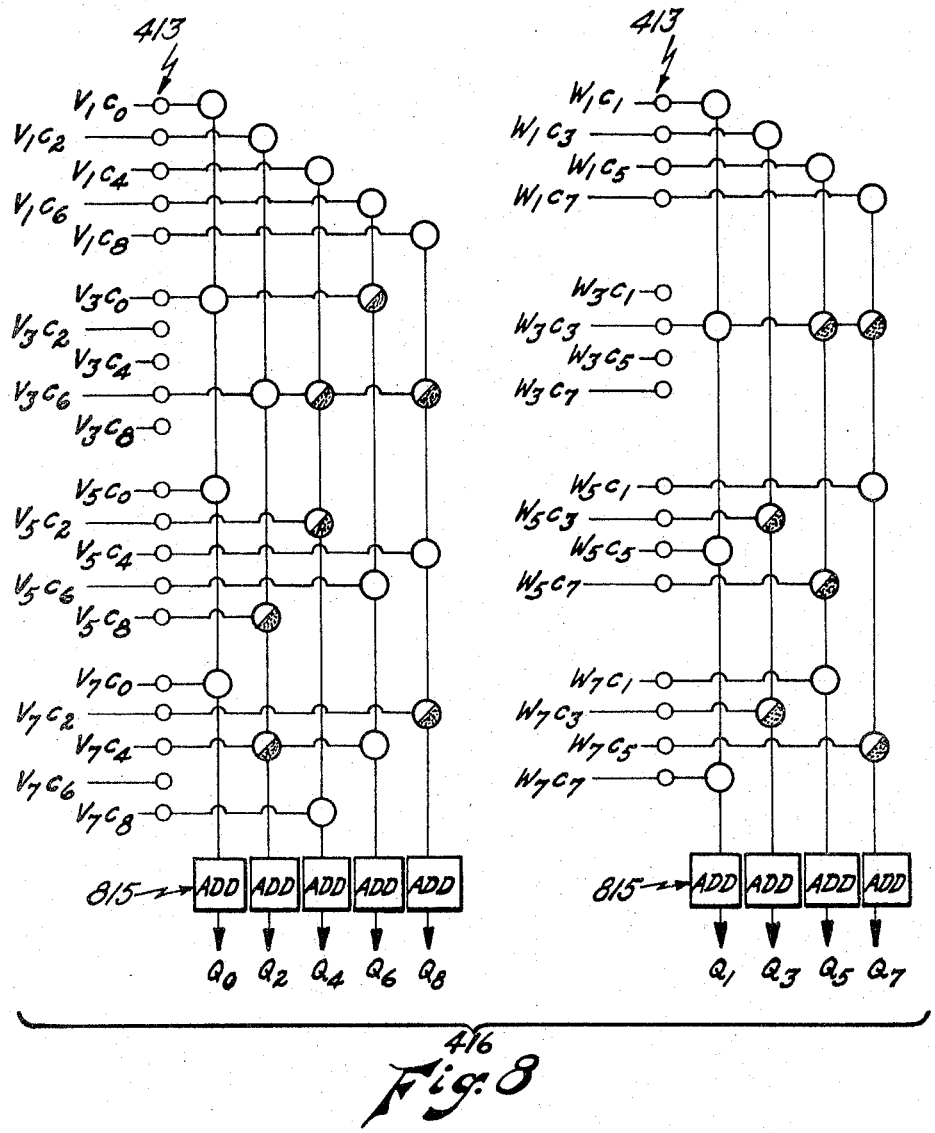
FIGURE 8 illustrates program switches summing the values $Q_i$.
Figure 9:
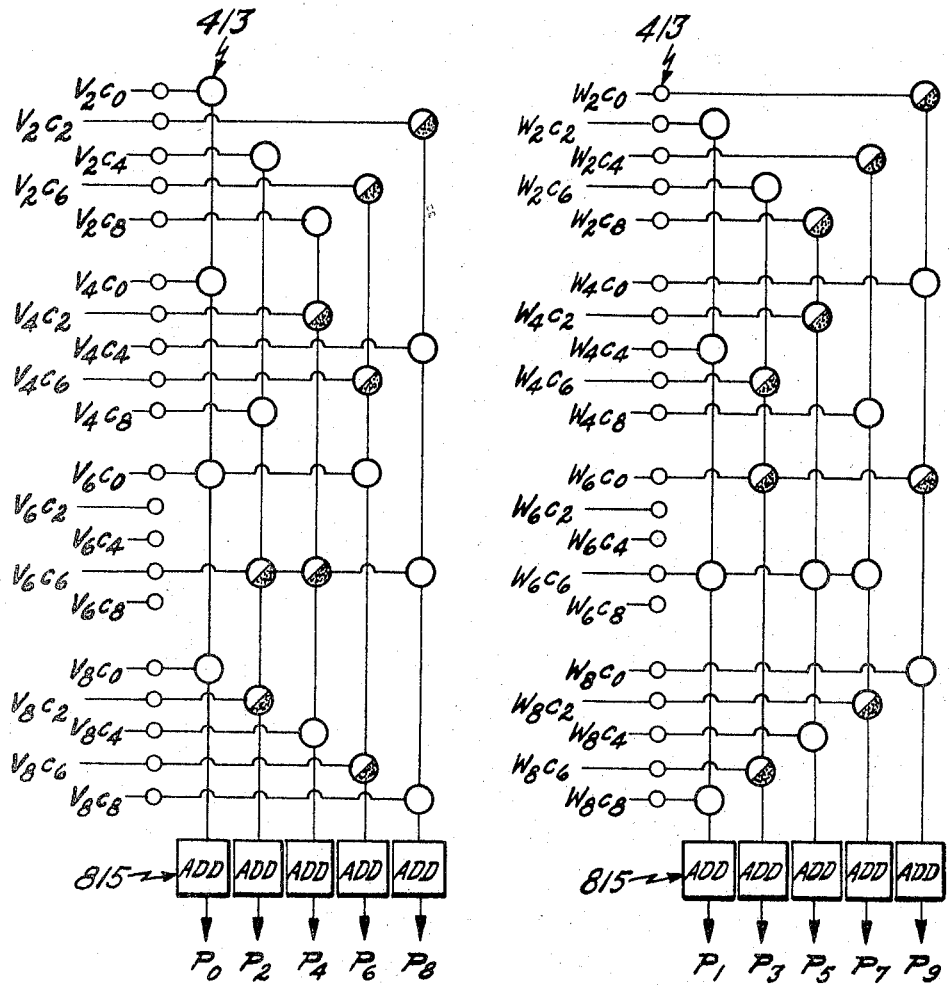
FIGURE 9 illustrates program switches summing the values $P_i$.
Figure 10:
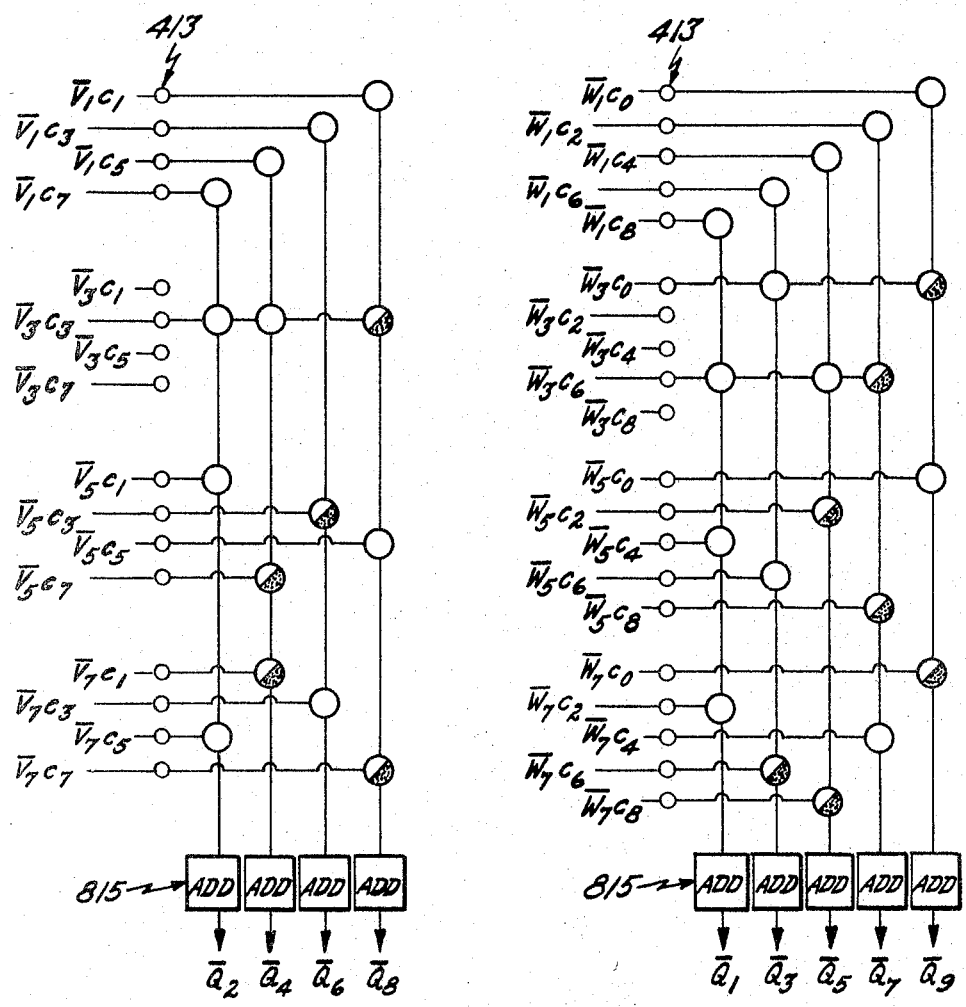
FIGURE 10 illustrates program switches summing the values $\overline{Q}_i$.
Figure 11:
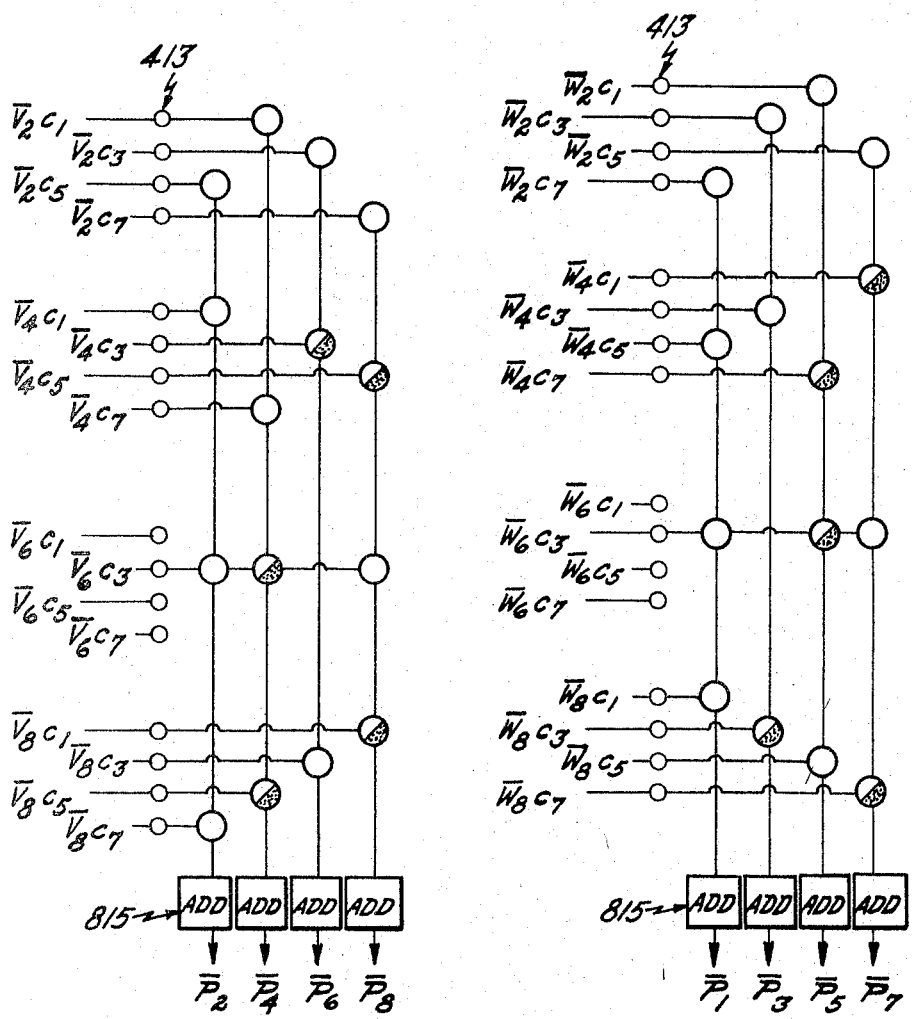
FIGURE 11 illustrates program switches summing the values $\overline{P}_i$.

FIGURE 7 illustrates the next stage. When shaft 201 performs one revolution and stops, the potentials are distributed on the circumference contacts of $CS_5$ through leads 231 and 232. $CS_5$ has 32 contacts on its circumference. Shaft 301 is coupled with shaft 401 of the multiplier in such a way that as long as arm 302 of $CS_5$ rests on any contact, shaft 401 of the multiplier performs one revolution. Hence the multiplier makes 32 revolutions for each revolution of shaft 301. That is to say $CS_5$ makes one revolution and stops; the multiplier at the same time makes 32 revolutions and stops. Through multiplier stage 7 the stored values V, W, $\overline{V}$ and $\overline{W}$ are multiplied by real numbers smaller or equal to one through use of a resistor potentiometer as shown in FIGURE 7. The contacts of $CS_5$ are interconnected, lead 311, by the resistors $R_1 \ldots R_8$ of the multiplier and the last contact is linked to ground ($=0$) through resistor $R_9$. Synchronized with the multiplier is sampler switch $SS_7$ which links the products (V, etc. values multiplied by $c_0$, $c_1$, etc., leads 411 and 413) to the array of a program switch.

FIGURES 8, 9, 10 and 11 show program switches 815. The program switches build the combinations $P_0 \ldots P_9$, 417, $Q_0 \ldots Q_9$, 416 and the corresponding barred values, leads 418 and 419. Each program switch works so that the array of contacts is brought in four or five positions for a summation operation. For example, on the left side of the program switch in FIGURE 8 on the line of the filled points 413, are the stored products $V_1c_2 \ldots V_7c_8$. If this line is covered by the first program line the products $V_1c_0$, $V_3c_0$, $V_5c_0$ and $V_7c_0$ are obtained. These values are added together to get $Q_0$, 416, in accordance with Equation 37. Covering the line by the second program line yields the products $V_1c_2$, $V_3c_6$, $-V_5c_8$ and $-V_7c_4$ on the line and by addition is obtained $Q_2$, 416. The other program switches work in the same way. The results P, Q, $\overline{P}$ and $\overline{Q}$ of FIGURES 8, 9, 10 or 11 are stored and linked, leads 416, 417, 418 and 419 to collector switches $CS_7$, $CS_6$, $CS_9$ and $CS_8$, respectively as further illustrated in FIGURES 12 and 13.

After the multiplier has stopped revolving, potentials are distributed on the circumference contacts of $CS_6$, $CS_7$, $SS_8$, $SS_9$, $CS_9$, $SS_{10}$, $SS_{11}$. All these switches are on common shaft 501 with $SS_{12}$, $SS_{13}$, $SS_{13}$ and $SS_{15}$.

Figure 12:
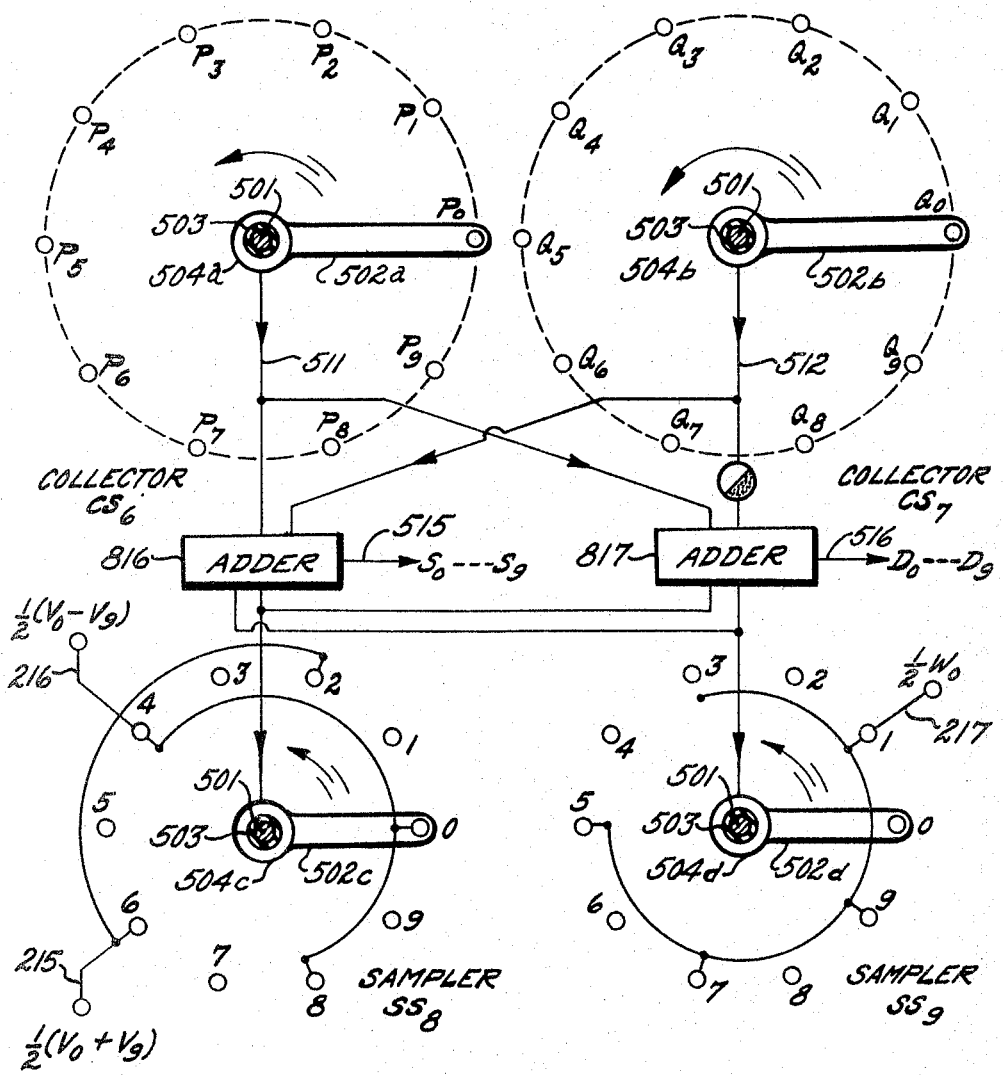
FIGURE 12 illustrates the $S_0 \ldots S_9$ and $D_0 \ldots D_9$ combination.
Figure 13:
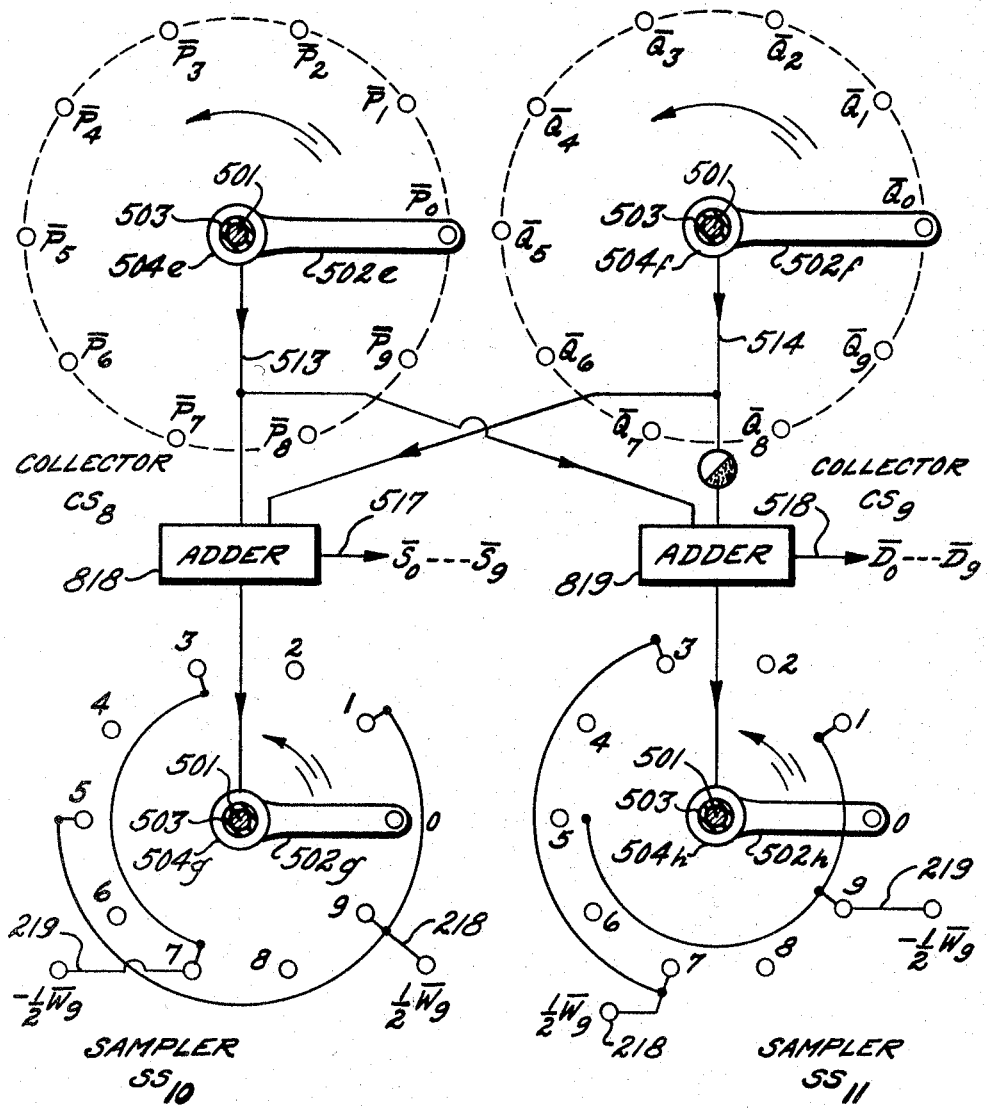
FIGURE 13 illustrates the $\overline{S}_0 \ldots \overline{S}_9$ and $\overline{D}_0 \ldots \overline{D}_9$ combination.

After $CS_5$ and the multiplier have stopped, shaft 501 makes one revolution and stops. Using input adders 816, 817, 818 and 819, the sums S defined in Equations 27 and 28, $\overline{S}$ defined in Equations 40 and 41, and the differences D defined in Equations 29 and 30, and $\overline{D}$ defined in equations in 42 and 43 are obtained as shown in FIGURES 12 and 13. These stages use the signals leads 215, 216, 217, 218 and 219, coming from the $V_m$, $W_m$, and $\overline{W}_m$ storage, respectively. All switches on FIGURES 12 and 13 are synchronized to make one rotation. The adders, 816–819, deliver the summations $S_0 \ldots S_9$, $\overline{S}_0 \ldots \overline{S}_9$ and the differences $D_0 \ldots D_9$, and $\overline{D}_0 \ldots \overline{D}_9$, respectively, leads 515–518, to potentiometers where they are multiplied by $\frac{1}{18}$. See FIGURE 14. These products are marked as S', D', and $\overline{S}'$ and $\overline{D}'$, leads 519–522, and stored on the contacts of the sampler switches $SS_{12} \ldots SS_{15}$ (FIGURE 14).

Figure 15:
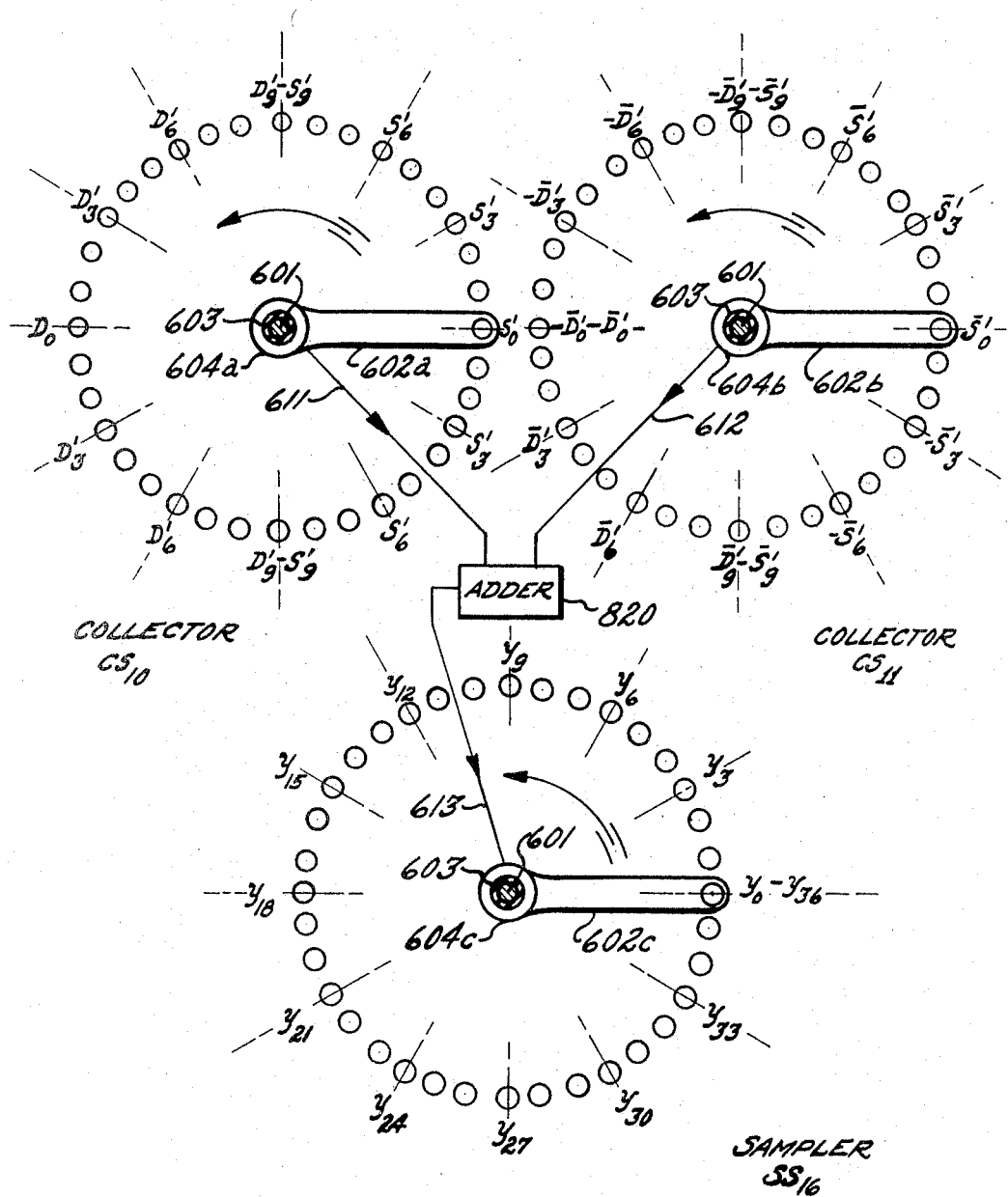
FIGURE 15 illustrates the $y_0 \ldots y_{36}$ display.

When shaft 501 makes one revolution and stops, potentials are now distributed on the circumference contacts of $CS_{10}$ and $CS_{11}$ which are on a common shaft 601 with $SS_{16}$. FIGURE 15 shows the collector switches $CS_{10}$ and $CS_{11}$ where the sums $S_0' \ldots S_9'$, $\overline{S}_0' \ldots \overline{S}_9'$ (with both polarities) and the differences $D_0' \ldots D_9'$, $\overline{D}_0' \ldots \overline{D}_9'$ (with both polarities) are stored on the contacts in such a way that by one arm rotation the final samples $Y_0 \ldots Y_{36}$ can be built in an adder 820, according to Equations 23 ... 26. And so it is seen that when shaft 601 makes one revolution the final result is distributed on the circumference contacts $SS_{16}$. The samples $Y_0, Y_1 \ldots Y_{35}, Y_{36}$ are delivered in time sequence either in analogues or in digits depending on the layout of the apparatus.

As long as the samples $y_0 \ldots y_{36}$ are stored they can be displayed by a following collector switch (not shown). An oscilloscope which is synchronized in its sweep by this collector displays the samples as vertical lines. It is to be noted there are various methods of performing Fourier synthesis of periodic polygonal functions. As above described, synthesis is performed by an automatic computer. Synthesis can also be performed by the use of punched program cards where the calculation is carried through on a desk calculator. Also, the method can be performed by separate sets of form cards for each subdivision index $n$, i.e. program forms, adapted according to individual need.

It is not necessary that a shaft start after the stop of the preceding one. The revolution intervals can be overlapped and thus a higher speed in the computation can be achieved.

The foregoing circuit elements described in detail above for one embodiment of the invention are to be taken as suggested and not as limiting the invention. It is therefore intended that the subject invention cover all such modifications and applications as fall within the scope of the appended claim.

What I claim is:

Apparatus for synthesizing a periodic wave having a non-sinusoidal time function comprising:

first and second sampler switch storage means for storing a predetermined number of sample harmonic values of input signals representative of $n$ periodic coefficients, said first sampler switch means storing signals having the function $$\sum_{i=1}^{n} y_i \cdot \cos \frac{\pi m}{n} i$$

$i$, $m$, and $n$ being integers and $y$, $i$ representing sample values, and said second sampler switch means storing signals having the function $$\sum_{i=1}^{n} y_i \cdot \sin \frac{\pi m}{n} i$$

a first grouping stage comprising a plurality of first, second, third and fourth collector switch means, converter means and adder means, all electrically interconnected with each other and to said first and second sampler switch storage means for collecting sums and differences of amplitudes of signals of intercorrelated coefficient values to provide one of the groups of sample values $y_i, y_{2n-i}, y_{n+i}$;

a plurality of storage switch means connected to the outputs of said first grouping stage for storing signals representative of said sums and differences;

a multiplier stage comprising potentiometer means connected to said storage switch means for multiplying the signals of groups obtained from said first grouping stage by their corresponding periodic real number factors;

synchronizing storage means for storing the output product signals from said multiplier stage;

a program array connected to the output of said synchronizing storage means and comprising a plurality of program switches, converters and adders electrically interconnected to provide signals representative of groups of sums of said stored products;

a second grouping stage connected to the outputs of said program array and to the outputs of said first grouping stage and comprising a plurality of collector switches, sampler switches, adders and converters electrically interconnected to provide signals representative of summed values and differences values of said groups of sums of stored products from said program array;

first collector means connected to the output of said second grouping stage for collecting signals representative of said summed values;

second collector means connected to the output of said second grouping stage for collecting signals representative of said difference values;

and means including a sampler switch stage connected to the outputs of said first and second collector means to form $2n$ output signals which represent the periodic waveform being synthesized.

References Cited by the Examiner

UNITED STATES PATENTS

| | | | |
|---|---|---|---|
| 2,660,700 | 11/1953 | Gates | 235—184 X |
| 2,771,509 | 11/1956 | Dudley et al. | 84—1.03 X |
| 2,855,816 | 10/1958 | Olson et al. | 84—1.03 |
| 3,015,979 | 1/1962 | Davis | 84—1.03 X |
| 3,051,389 | 8/1962 | Fayard | 235—197 X |
| 3,051,391 | 8/1962 | Fayard | 235—197 |

OTHER REFERENCES

International Business Machines Corporation, reference manual, IBM 7090 Data Processing System A22–6528, 3 ed., August 1961.

MALCOLM A. MORRISON, *Primary Examiner.*

I. KESCHNER, K. W. DOBYNS, *Assistant Examiners.*